United States Patent [19]
Fleming et al.

[11] Patent Number: 5,255,561
[45] Date of Patent: Oct. 26, 1993

[54] APPARATUS FOR MEASURING SMOOTHNESS

[76] Inventors: Colin T. Fleming; Zbigniew Rybak, both of 14 Henderson Street, Bulimba, Queensland 4171, Australia

[21] Appl. No.: 837,480

[22] Filed: Feb. 18, 1992

[30] Foreign Application Priority Data
Feb. 19, 1991 [AU] Australia .................... PK 4669

[51] Int. Cl.⁵ .................................... G01B 7/00
[52] U.S. Cl. ............................ 73/146; 33/1 H; 33/521; 73/151
[58] Field of Search ............... 73/146, 151, DIG. 3; 33/521, 523, 775, 773, 779, 338, 1 H

[56] References Cited
U.S. PATENT DOCUMENTS 4,561,299 12/1985 Orlando et al. .................... 73/151
5,107,598 4/1992 Woznow et al. .................... 73/146

Primary Examiner—Donald D. Woodiel
Attorney, Agent, or Firm—Mathews, Woodbridge & Collins

[57] ABSTRACT

An apparatus for determining smoothness of a surface is disclosed. The apparatus has a distance wheel for determining distance travelled along the surface and two laterally spaced inclination sensors which produce signals indicative of inclination of the apparatus at locations along the surface over which the apparatus travels.

12 Claims, 10 Drawing Sheets

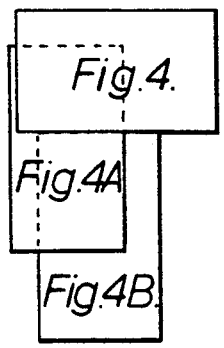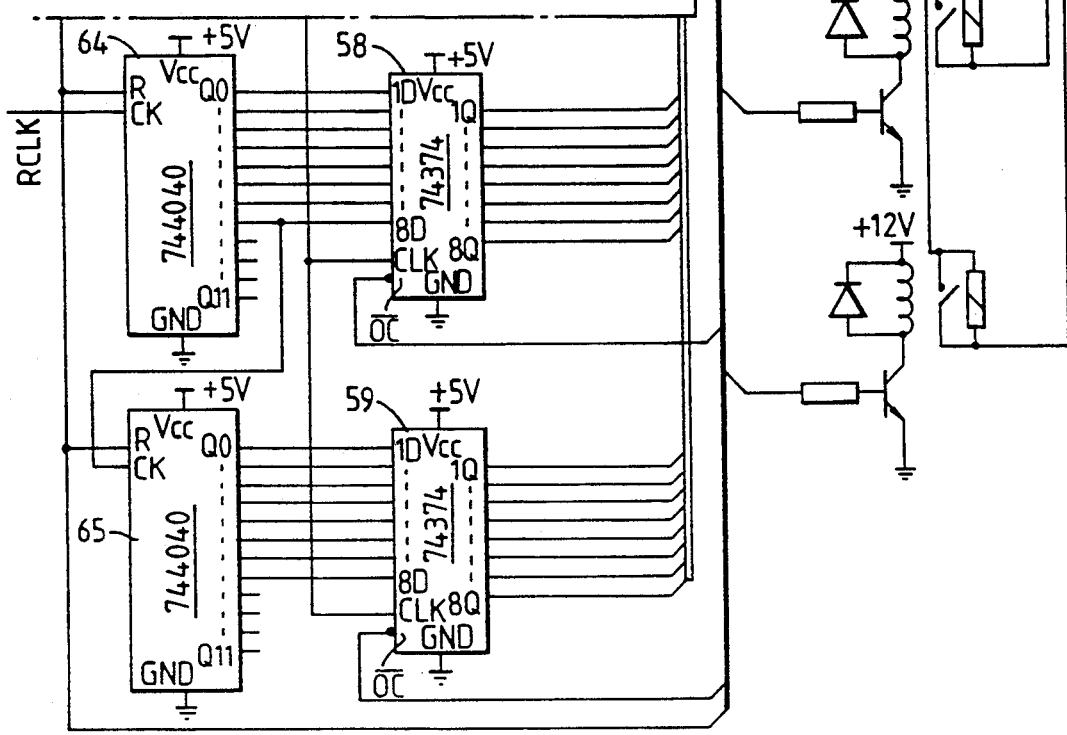

| RUN 1 | RUN 2 | SURVEY | SUR-AV(R1,R2) | |
|---|---|---|---|---|
| 0 | 0 | 0 | 0 | 0 |
| 2 | 3 | 2 | 0 | |
| 1 | 5 | 4 | -1 | |
| 1 | 6 | 7 | -3 | |
| 4 | 9 | 9 | -2 | |
| 8 | 13 | 11 | 0 | 0 |
| 14 | 18 | 15 | 1 | |
| 20 | 24 | 20 | 2 | |
| 24 | 28 | 24 | 2 | |
| 28 | 32 | 29 | 2 | |
| 29 | 36 | 33 | 0 | 0 |
| 31 | 38 | 35 | -1 | |
| 34 | 40 | 38 | -1 | |
| 36 | 42 | 40 | -1 | |
| 39 | 44 | 42 | -1 | |
| 42 | 46 | 45 | -1 | -1 |
| 45 | 50 | 47 | 0 | |
| 47 | 52 | 50 | 0 | |
| 48 | 53 | 52 | -1 | |
| 49 | 54 | 54 | -3 | |
| 50 | 55 | 57 | -4 | -4 |
| 52 | 56 | 58 | -4 | |
| 53 | 54 | 59 | -5 | |
| 55 | 57 | 60 | -4 | |
| 58 | 58 | 61 | -2 | |
| 62 | 61 | 62 | 0 | 0 |
| 68 | 67 | 66 | 1 | |
| 70 | 69 | 70 | 0 | |
| 74 | 72 | 74 | -1 | |
| 78 | 75 | 78 | -1 | |
| 82 | 76 | 82 | -3 | -3 |
| 85 | 78 | 84 | -2 | |

*Fig.5.*

| RUN 1 | RUN 2 | SURVEY | SUR-AV(R1,R2) | |
|---|---|---|---|---|
| 87 | 81 | 86 | -2 | |
| 90 | 83 | 88 | -1 | |
| 93 | 85 | 90 | -1 | |
| 92 | 88 | 92 | -2 | -2 |
| 94 | 91 | 93 | -1 | |
| 99 | 93 | 95 | 1 | |
| 98 | 95 | 96 | 0 | |
| 99 | 97 | 98 | 0 | |
| 98 | 97 | 100 | -2 | -2 |
| 98 | 99 | 100 | -1 | |
| 98 | 99 | 100 | -2 | |
| 99 | 100 | 101 | -1 | |
| 99 | 100 | 101 | -2 | |
| 99 | 100 | 102 | -2 | -2 |
| 99 | 101 | 102 | -2 | |
| 98 | 99 | 102 | -4 | |
| 98 | 100 | 102 | -3 | |
| 98 | 100 | 102 | -3 | |
| 99 | 104 | 103 | -1 | -1 |
| 103 | 106 | 104 | 0 | |
| 104 | 107 | 106 | -1 | |
| 107 | 110 | 108 | 0 | |
| 108 | 112 | 110 | 0 | |
| 109 | 116 | 112 | 0 | 0 |
| 112 | 118 | 114 | 1 | |
| 114 | 120 | 115 | 2 | |
| 114 | 119 | 116 | 1 | |
| 115 | 118 | 117 | -1 | |
| 114 | 117 | 116 | 0 | 0 |
| 113 | 118 | 116 | -1 | |
| 111 | 117 | 113 | 1 | |
| 109 | 116 | 110 | 2 | |

*Fig.5A.*

| RUN 1 | RUN 2 | SURVEY | SUR-AV(R1,R2) | |
|---|---|---|---|---|
| 106 | 112 | 107 | 2 | |
| 104 | 107 | 104 | 2 | 2 |
| 97 | 100 | 97 | 2 | |
| 92 | 95 | 92 | 1 | |
| 87 | 87 | 84 | 3 | |
| 80 | 81 | 79 | 2 | |
| 73 | 73 | 71 | 2 | 2 |
| 66 | 63 | 66 | -1 | |
| 62 | 59 | 60 | 0 | |
| 56 | 55 | 54 | 1 | |
| 52 | 51 | 49 | 3 | |
| 48 | 46 | 43 | 4 | 4 |
| 44 | 40 | 39 | 3 | |
| 39 | 37 | 35 | 3 | |
| 34 | 32 | 31 | 2 | |
| 32 | 26 | 26 | 3 | |
| 24 | 18 | 22 | -1 | -1 |
| 17 | 11 | 16 | -2 | |
| 10 | 5 | 10 | -3 | |
| 5 | -2 | 4 | -3 | |
| 2 | -6 | -2 | 0 | |
| -3 | -9 | -8 | 2 | 2 |
| -4 | -10 | -8 | 1 | |
| -5 | -10 | -9 | 1 | |
| -5 | -6 | -9 | 4 | |
| -4 | -5 | -9 | 5 | |
| -4 | -6 | -10 | 5 | 5 |
| -4 | -6 | -9 | 4 | |
| -3 | -6 | -8 | 4 | |
| -2 | -4 | -8 | 4 | |
| -1 | -2 | -7 | 5 | |
| 1 | -2 | -6 | 5 | 5 |

*Fig.5B.*

| RUN 1 | RUN 2 | SURVEY | SUR-AV(R1,R2) | |
|---|---|---|---|---|
| 3 | -1 | -5 | 6 | |
| 2 | 0 | -4 | 5 | |
| -1 | -1 | -2 | 1 | |
| 1 | 0 | -1 | 2 | |
| 0 | 0 | 0 | 0 | 0 |

Fig.5C.

APPARATUS FOR MEASURING SMOOTHNESS

THIS INVENTION relates to an apparatus for measuring the smoothness of a surface.

In particular, the invention concerns measuring the smoothness of large surfaces such as runways, roads, car parks or playing surfaces.

The invention will be described by way of example with reference to measuring the smoothness of airport runways. It should be appreciated that this is by way of example only and that the apparatus may also be used to advantage to measure the smoothness of other surfaces such as roads, paths and the like.

It should be understood that in measuring smoothness it does not matter whether or not the surface is level. The apparatus of the invention is not concerned with determining whether the surface is level (although this can be achieved) and indeed the smoothness of the surface can be measured regardless of whether or not the surface is level.

A variety of techniques for measuring smoothness are known. One known technique employs a straight edge or beam. This technique is purely manual in its application and is really only viable where the surface is relatively small in area. This technique by its very nature, is time consuming and not suitable for determining the smoothness of large areas such as runways.

Another technique employs a vehicle with sensor associated with an axle, typically the rear axle of the vehicle. The sensor measures the amplitude and frequency of undulations or bumps in the surface through movement of the suspension. The vehicle must travel at a set and constant speed typically 80 kilometers per hour and for this reason was only suitable for large areas. Readings can only be employed when the vehicle is travelling at a constant speed and thus the surface over which the vehicle accelerates and decelerates cannot be tested for smoothness. Results obtained from such vehicles were not repeatable and were generally inaccurate because of the large number of factors governing the movement likely between the vehicle chassis and axle.

Another known technique employed a laser to secure a level reading at regular intervals over the surface, typically 3 meters. A surveyor was employed to establish readings over a 3 meter grid pattern. This was time consuming, required skilled personnel and did not provide a truly representative indication of surface smoothness.

It is an object of the present invention to provide an apparatus for measuring surface smoothness which at least minimises the disadvantages referred to above.

According to one aspect of the invention there is provided an apparatus for determining the smoothness of a surface such as a runway, the apparatus including a wheeled carriage arranged for travel over the surface, drive means for driving the carriage over the surface at substantially constant speed, distance detecting means for determining distance travelled by the carriage, at least one sensor for detecting the orientation of the carriage relative to a reference axis and circuitry for receiving signals from the distance detecting means and the sensor for enabling a determination of the smoothness of locations along the surface to be determined.

The sensor is preferably an inclination detector which detects the inclination of the carriage relative to the reference axis. The reference axis is preferably the horizontal axis. The sensor may be an inclinometer. Preferably the sensor is an angle sensor employing a pendulum and the deflection of the arm of the pendulum from the vertical being indicative of the inclination of the carriage and hence the depth/height of a location along the path travelled by the carriage. The movement of the pendulum is preferably damped to avoid violent swings in response to surface undulations. Oil damping is preferred. Deviations of the pendulum are detected by a deviation detector and translated into a signal whose magnitude is indicative of that deviation. A Hall effect device and magnets arranged at one end of the arm of the pendulum may be used for this purpose.

Preferably two sensors of the type discussed are present on the carriage. By having these sensors laterally displaced relative to each other it is possible to simultaneously secure an indication of surface undulations along two laterally spaced runs along the surface. These two indications enable a calculation of the transverse slope of the surface between the two runs to be readily determined.

The drive means is preferably a constant velocity drive. In one embodiment the drive means is a DC motor which either directly or indirectly drives one of the wheels of the carriage. The carriage is preferably driven at walking speed although other speeds may be used. The DC motor may include a motor drive which ensures that a particularly accurate constant velocity drive is achieved. Rapid acceleration and deceleration should be avoided as this may unduly affect the operation of the sensor(s).

The distance detecting means may comprise a distance wheel with an encoder for providing pulses, the summation of which is indicative of distance travelled. The encoder may be a shaft encoder. The distance wheel is preferably the wheel driven by the drive means although this need not be the case.

The circuitry may include a counter for counting the distance indicative pulses. In addition the circuitry may include processing means for detecting the sensor output and providing a signal indicative of depth/height of locations along the surface. Preferably a voltage to frequency converter and counter are employed.

The embodiment of the invention will now be described by way of example with reference to the drawings.

Figure 3:
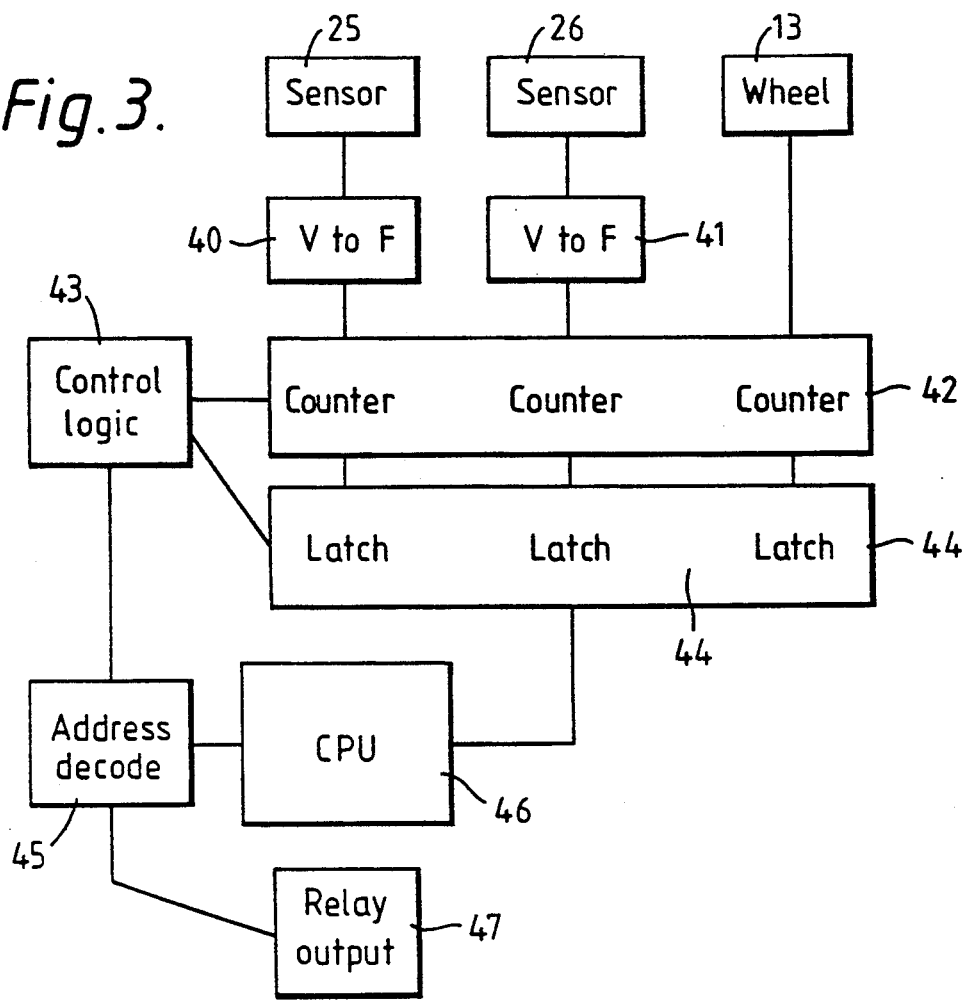
FIG. 3 is a block diagram of a data gathering and control circuit of the apparatus.
Figure 4:
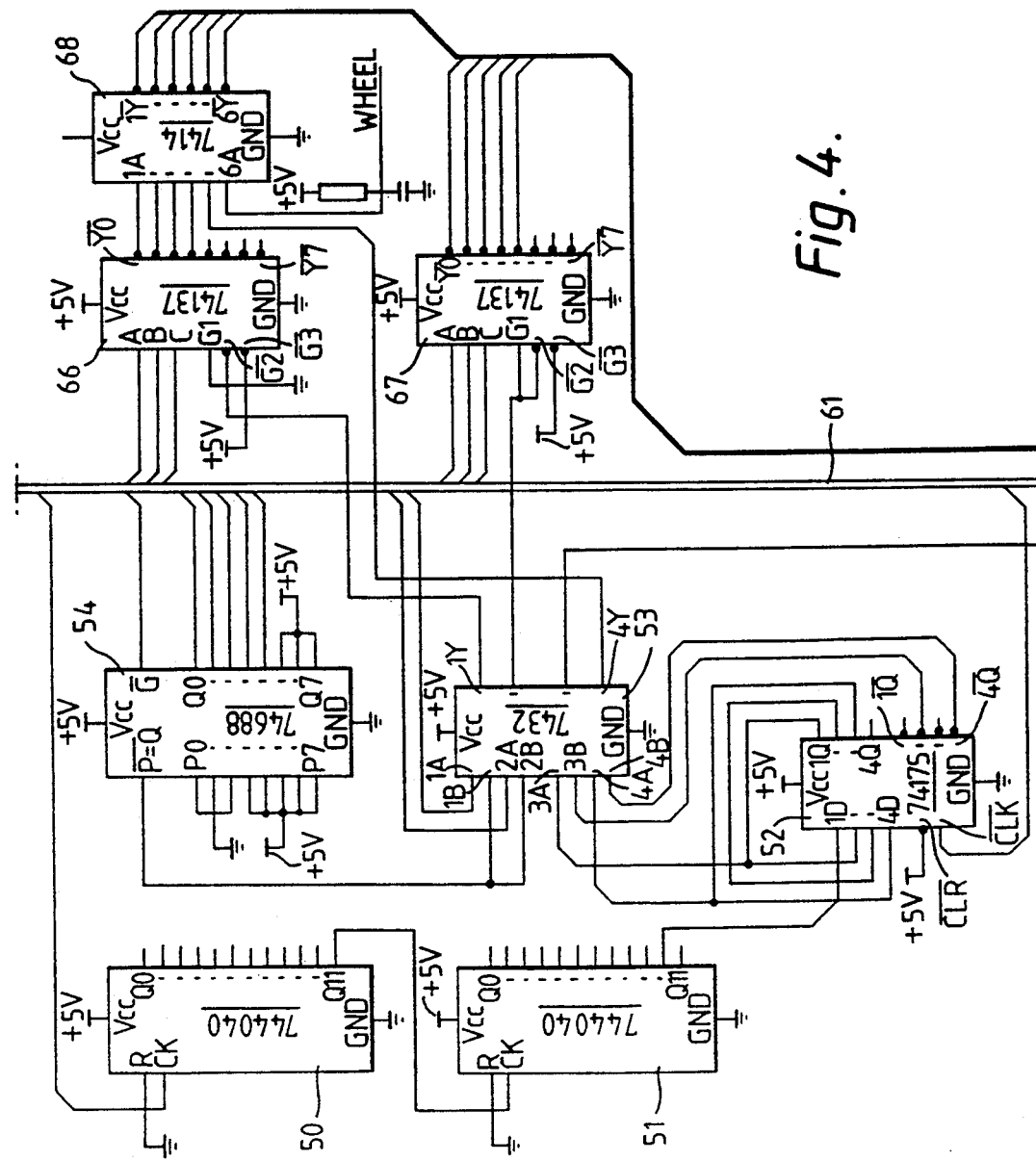
Figure 4A:
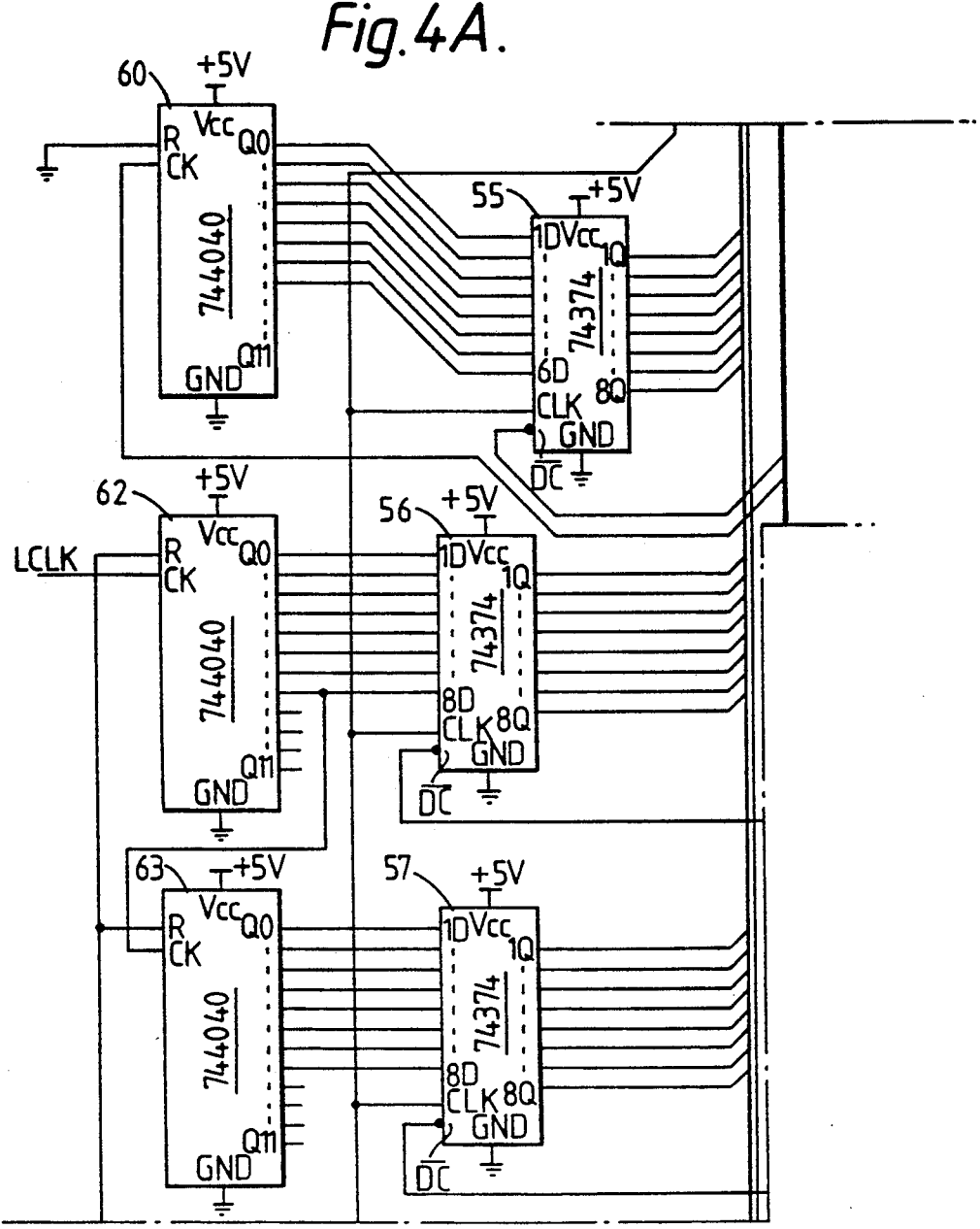

FIGS. 4, 4A and 4B collectively provide a detailed circuit diagram of part of the circuit of FIG. 3;

FIGS. 5, 5A, 5B and 5C show a table with typical measurement runs using the apparatus.

Figure 6:
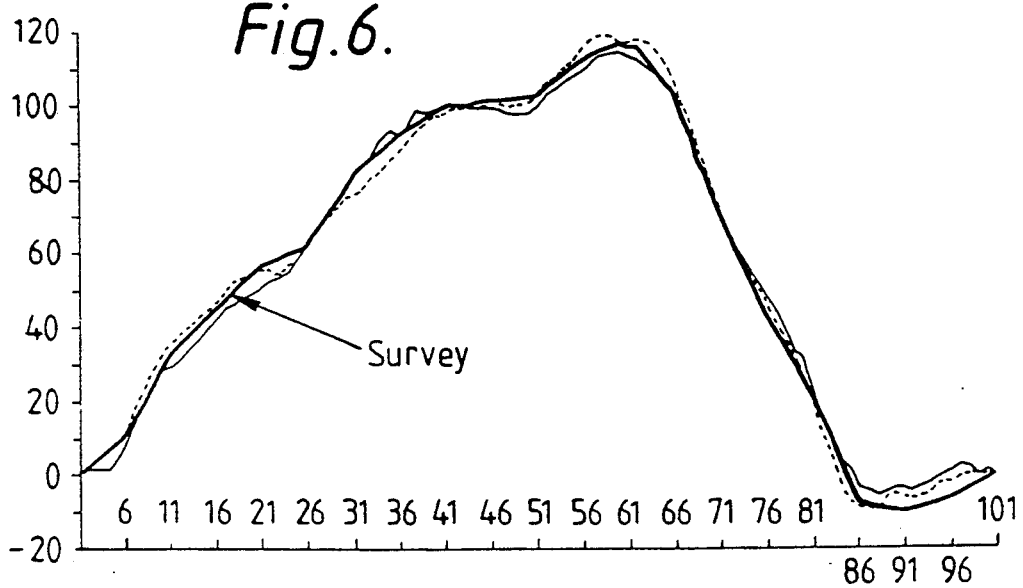

FIG. 6 is a graph of the runs shown in FIG. 5; and

Figure 7A:
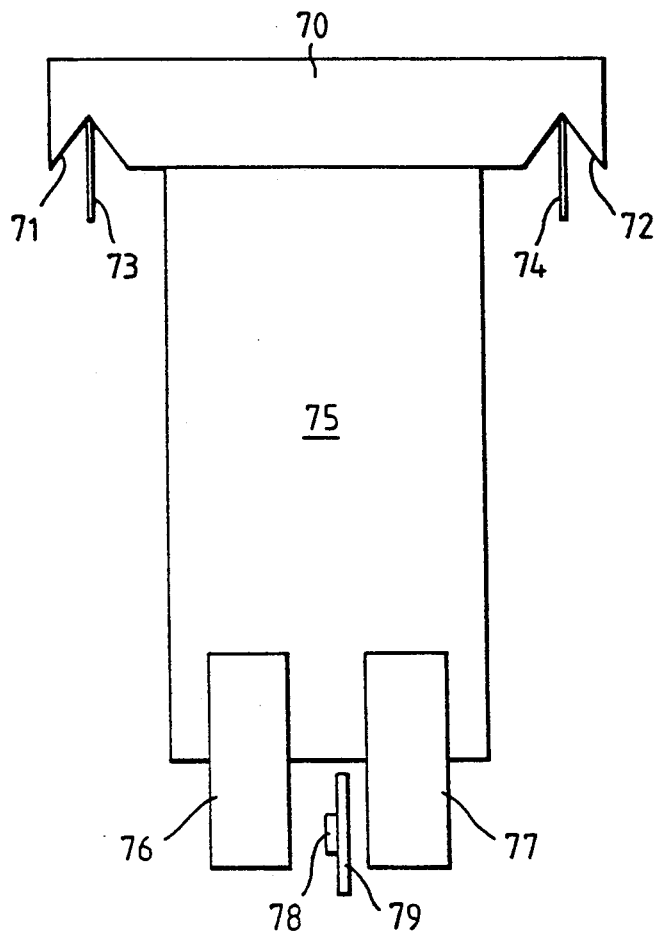
Figure 7B:
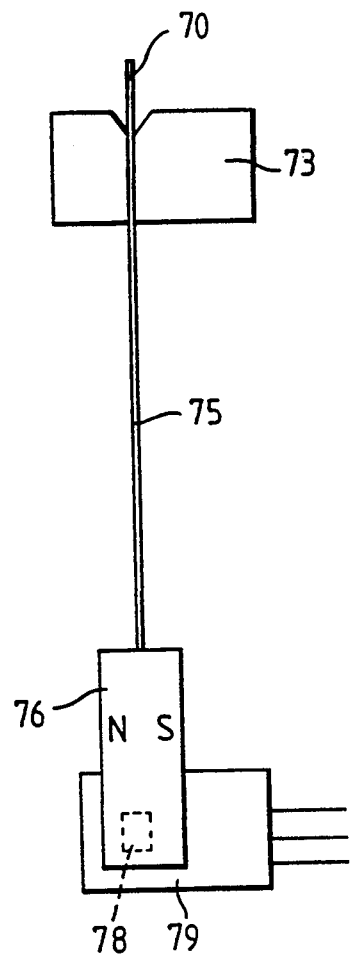
Figure 7C:
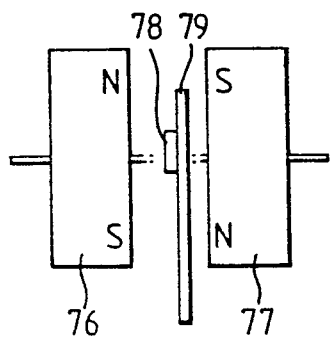

FIGS. 7a, 7b and 7c are views of a typical sensor according to an embodiment of the invention.

Figure 1:
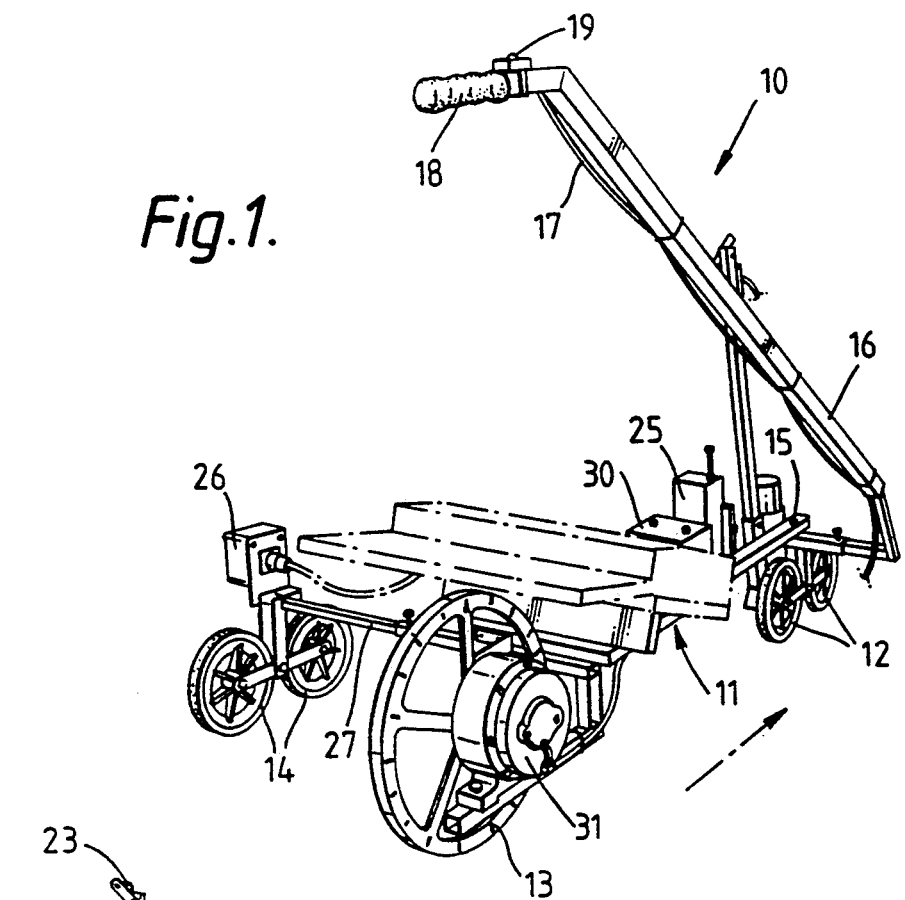
FIG. 1 is a rear perspective view of an apparatus according to a preferred embodiment of the invention.
Figure 2:
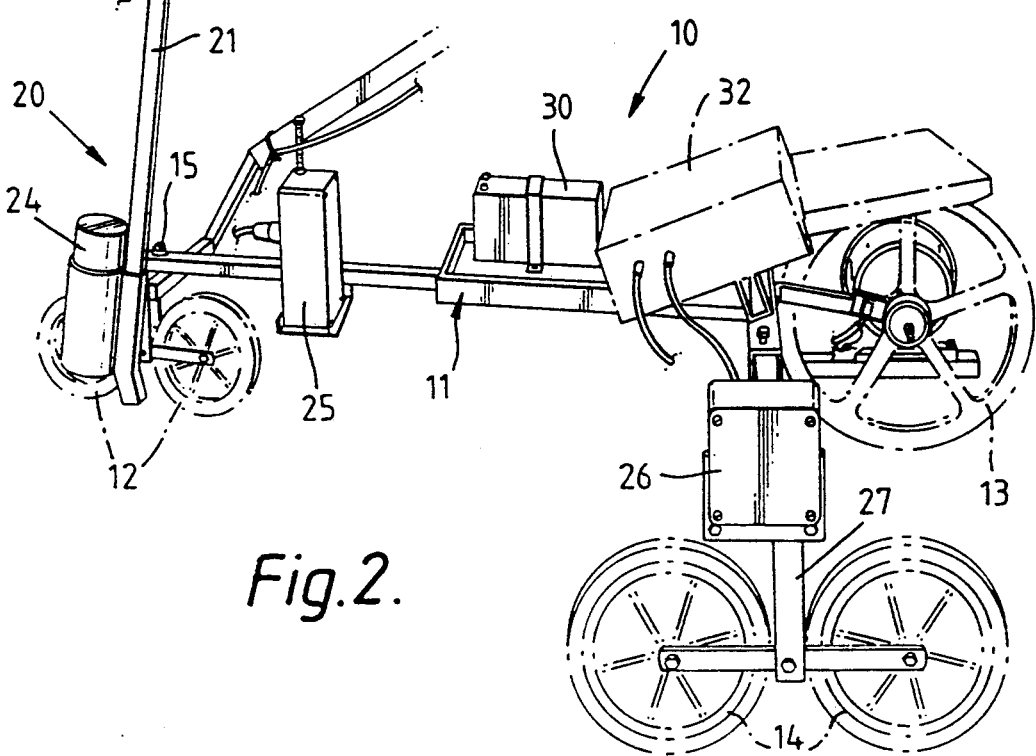
FIG. 2 is a side perspective view of the apparatus of FIG. 1.

The apparatus 10 shown in FIGS. 1 and 2 has a carriage 11 on wheels 12, 13, 14. Wheels 12 are secured to the carriage 10 by substantially upright pivot axis 15. Steering arm 16 enables the wheels to be moved about axis 15. Control wire 17 terminates at handle 18. Control switch 19 enables the apparatus to be activated for travel over the surface to be tested and to terminate travel after a test run has been completed.

Located towards the front of the apparatus 10 is a marker attachment 20. Attachment 20 has an arm 21 at one end of which a solenoid 22 is located to pivot lever 23. Lever 23 is linked via a cable (not shown) to control the spray nozzle of an inverted spray can 24. This enables spray paint marking at selected intervals along a test run over a surface to be achieved.

Sensor 25 is located on the carriage 11 and provides a signal indicative of the level or bumps and hollows in the surface. A second sensor 26 is located on outrigger arm 27 of the carriage to provide signals representative of bumps and hollows occurring laterally spaced from sensor 25. Arm 27 may be of adjustable length and typically has a length of about 3 meters.

A battery 30 is mounted to the carriage and provides power for drive motor 31 and on board circuit 32.

Motor 30 is coupled to drive wheel 13. The circumference of wheel 13 corresponds to unit distance and enables precise distance travelled by the apparatus to be determined. Typically, one rotation of wheel 13 corresponds to one meter. Motor 31 is able to propel the apparatus at constant velocity. Rotation of wheel 13 produces pulses which may be counted to give an indication of distance travelled. A shaft encoder mounted to the wheel 13 produces the pulses. These pulses may be monitored to provide an indication of acceleration and deceleration. These pulses may be employed to drive an emulator for the sensor which provides a signal proportional to amplitude, decay time and frequency to the sensor. This signal may be employed to correct raw readings secured by the apparatus and eliminate the need to maintain accurate speed control.

FIG. 3 is useful in understanding the operation of circuit 32 of FIGS. 1 and 2. Onboard circuit 32 includes respective voltage to frequency converters 40, 41 for sensors 25, 26. Sensors 25, 26 provide a voltage output indicative the magnitude of a bump or hollow in the surface being tested and the converters convert this voltage level into a pulse train the frequency of which corresponds to magnitude. Wheel 13 produces a pulse output and the pulse count is indicative of distance travelled.

Counter section 42 counts the pulses produced by the wheel 13 and by converters 40, 41 and makes the counts available to latch section 44 which includes respective latches for each of these counts. Control logic circuit 43 receives signals which periodically enables the latches and resets the counters. Computer 46 provides outputs for relay control 47 to operate relay 22 (see FIG. 2) and to control logic circuit 43 via address decode circuit 45 to enable the latch outputs to be stored in non-volatile memory of the computer 46. At the end of a test run, data stored by computer 46 may be dumped to a further computer and processed to give an indication of smoothness of the surface for that test run.

FIGS. 4, 4A and 4B show a detailed circuit diagram for part of the circuit of FIG. 3.

Counters 50, 51 together with associated components provide a time base signal for the voltage to frequency convertors in the circuit. The output from counter 51 is applied to 8×D type Flip Flop 52. D type Flip Flop 52 has its outputs coupled to QUAD OR gates 53 which together with address decoder 54 control the operation and accessing of latches 55 to 59.

Counter 60 counts the pulses produced by wheel 13 and is not reset to zero during a test run. The output from counter 60 is applied to latch 55 and is made available to the bus 61 by that latch.

Counters 62, 63 provide a 16 bit counter for counting the pulse output of one of the voltage to frequency converters. This output count is made available to latches 56, 57. Counters 62, 63 are periodically reset during a test run. Counters 64, 65 provide a 16 bit counter for counting the pulse output from the other voltage to frequency converter and the count is made available to latches 58, 59 and then bus 61.

Flip Flops 66, 67 and HEX Schmidt trigger 68 provide a latch address decoder to enable latches 55 to 59 to selectively output onto the bus 61. In addition these devices control relay driver circuit 70 for controlling periodic marking of locations along the test run with paint. Further relay driver circuits are shown. These are not used in this embodiment of the invention.

FIGS. 7a, 7b and 7c show details of one embodiment of sensor 25 or 26 employed in the apparatus to obtain an indication of the height of a rise, or the depth of a trough in the surface being tested. The sensor includes a beam 70 with notches 71, 72 resting of knife edges 73, 74 for free pivotal movement. Beam 70 has an arm 75 attached to it. Arm 75 carries magnets 76, 77. Hall effect device 78 mounted to a substrate 79 is positioned between the magnets and the output obtained from device 78 is indicative of the height/depth of a rise or trough. This pendulum sensor is mounted within an oil filled casing to implement the sensors 25, 26 of FIG. 1 and FIG. 2. The oil is used to damp the swings of the sensor. The axis along beam 70 is kept at 90° to the direction along which the apparatus moves and the beam axis of one sensor is kept parallel to the beam axis of the other sensor. If desired the beam axis may provide for adjustment to achieve these relationships.

FIGS. 5, 5A, 5B and 5C show two separate runs of the apparatus of the invention over a 100 m distance. Depth/height readings were taken at 1 m intervals for run 1 and 2 and compared with actual survey readings taken at the same intervals over the same distance. The readings are in millimeters. The fourth column is representative of the difference between average of the two "run" values and the survey value (rounded off to the nearest 1 mm). The final column shows the result of this calculation at 5 m intervals. The values shown in FIGS. 5, 5A, 5B and 5C are graphed in FIG. 6.

FIGS. 5, 5A, 5B, 5C and 6 show the great degree of accuracy available with the apparatus of the invention. Not only is it possible to mark the surface at selected intervals but the relative height (or depth) of any location along the run to the height at the starting point of the run is readily available. This information is particularly useful for facilitating correction to the surface either by removing or adding road material.

What is claimed is:

1. An apparatus for determining the smoothness of a surface such as a runway, the apparatus including a wheeled carriage arranged for travel over the surface, drive means for driving the carriage over the surface at substantially constant speed, distance detecting means for determining distance travelled by the carriage, the drive means including a DC motor for driving one of the wheels of the carriage, at least one sensor for detecting the orientation of the carriage relative to a reference axis and circuitry for receiving signals from the distance detecting means and the sensor for enabling a determination of the smoothness of locations along the surface to be determined.

2. The apparatus of claim 1 wherein said sensor is an inclination detector which detects the inclination of the carriage relative to the reference axis.

3. The apparatus of claim 2 wherein said sensor is an inclinometer.

4. The apparatus of claim 2 wherein said sensor includes a pendulum mounted for pivotal movement about an axis extending transversely of the apparatus, magnets and a hall effect device arranged at one end of the pendulum, said hall effect device providing an output indicative of the deviation of the pendulum.

5. The apparatus of any one of claims 1 to 4 including two of said at least one sensor laterally spaced relative to one another for securing simultaneous indications of surface undulations along two laterally spaced runs along the surface.

6. The apparatus of claim 1 wherein said distance detecting means comprises a distance wheel with an encoder providing a pulse output the summation of which is indicative of distance travelled.

7. The apparatus of claim 6 wherein the encoder is a shaft encoder coupled to the distance wheel.

8. The apparatus of claim 6 wherein said circuitry includes a voltage to frequency converter coupled to the sensor, a counter for counting pulse output provided by the converter and a latch for storing the count.

9. The apparatus of claim 8 wherein said circuitry further includes a computer coupled to the latch, address decode circuit coupled to the computer and control logic circuit coupled to the address decode circuit and latch.

10. The apparatus of claim 9 including a relay output circuit coupled to the computer and said address decode circuit for controlling one or more relays.

11. The apparatus of claim 8 including a counter for counting the pulse output produced by the distance wheel, a distance latch for storing the count to enable the computer to determine distance travelled by the apparatus.

12. An apparatus for determining the smoothness of a surface such as a runway, the apparatus including a wheeled carriage, one of the wheels including an encoder for providing a pulse output indicative of distance travelled, drive means for driving said one wheel to propel the apparatus over the surface at substantially constant speed, two laterally spaced inclination sensors comprising pendulums mounted for pivotal movement about an axis transverse of the apparatus and having magnets and a hall effect device arranged at one end of the pendulum, the hall effect device providing an output indicative of the deviation of the pendulum, and circuitry responsive to the sensors and the encoder for providing a determination of the smoothness of locations along the surface.

* * * * *